United States Patent [19]

Wu

[11] Patent Number: 4,460,482

[45] Date of Patent: Jul. 17, 1984

[54] COMPOSITION AND METHOD FOR CORROSION INHIBITION

[75] Inventor: Yulin Wu, Bartlesville, Okla.

[73] Assignee: Phillips Petroleum Company, Bartlesville, Okla.

[21] Appl. No.: 298,445

[22] Filed: Sep. 1, 1981

[51] Int. Cl.³ .................. C23F 11/14; E21B 41/02
[52] U.S. Cl. ............... 252/8.55 E; 252/392; 422/7; 422/16
[58] Field of Search .................. 422/16, 7, 9; 252/8.55 E, 392

[56] References Cited

U.S. PATENT DOCUMENTS

| | | | |
|---|---|---|---|
| 2,598,213 | 5/1952 | Blair | 252/8.55 E |
| 2,614,980 | 10/1952 | Lytle | 252/8.55 E |
| 2,614,981 | 10/1952 | Lytle | 252/8.55 E |
| 2,640,029 | 5/1953 | Blair et al. | 252/8.55 E |
| 2,649,415 | 8/1953 | Sundberg et al. | 252/8.55 E |
| 2,814,593 | 11/1957 | Beiswanger et al. | 252/8.55 E |
| 2,836,557 | 5/1958 | Hughes | 252/8.55 E |
| 2,836,558 | 5/1958 | Hughes | 252/8.55 E |
| 2,840,525 | 6/1958 | Jones | 252/8.55 E |
| 2,954,825 | 10/1960 | Bernard et al. | 166/9 |
| 3,397,152 | 8/1968 | Brown et al. | 252/390 |
| 3,398,196 | 8/1968 | Miller et al. | 260/583 |
| 3,412,025 | 11/1968 | Ostroff | 252/8.55 E |
| 3,770,815 | 11/1973 | Jones | 252/8.55 E |
| 3,977,994 | 8/1976 | Geiser | 252/392 |
| 4,089,789 | 5/1978 | Muzyczko et al. | 252/8.55 E |
| 4,112,050 | 9/1978 | Sartori et al. | 423/223 |
| 4,339,349 | 7/1982 | Martin et al. | 252/8.55 D |
| 4,341,716 | 7/1982 | Diery et al. | 252/392 |

Primary Examiner—Benjamin R. Padgett
Assistant Examiner—Howard J. Locker

[57] ABSTRACT

A composition is provided which, when applied to a metal surface, forms a corrosion-inhibiting film thereon. The composition comprises an amine, a hydrocarbon or alcohol diluent and carbon dioxide. The composition can be prepared by pressuring carbon dioxide gas into a solution of the amine. The composition is particularly useful in the treatment of down-well metal surfaces in oil and gas wells to inhibit the corrosion of the metal.

27 Claims, No Drawings

COMPOSITION AND METHOD FOR CORROSION INHIBITION

This invention relates to the treatment of metal surfaces to increase their resistance to corrosion. It further relates to compositions which form a corrosion-resistant film on metal surfaces to which they are applied.

The problem of corrosion of metal surfaces in contact with air and water is well known. Corrosion and pitting are accelerated in environments in which metal surfaces are in contact with chemicals such as hydrogen sulfide, carbon dioxide an organic acids, and water having a high electrolyte concentration. Such environments are typical of down-well conditions in oil and gas wells, in which corrosion of metal pipes, pumps and other equipment poses a serious problem requiring monitoring of well sites, frequent maintenance and costly replacement of parts. Oil recovery operations in deep-sea oil fields present these corrosion problems in their most extreme form. The down-well metal surfaces are in contact with large quantities of corrosive chemicals such as dissolved acid gases present in the recovered oil, and, in addition, the metal surfaces are subjected to temperatures of 250° F. or higher and pressures of 3000 psig or higher, the extreme conditions of temperature and pressure acting to accelerate corrosion and to intensify the problems of applying and maintaining chemical protection for the equipment. In offshore oil wells, secondary recovery operations involving waterflooding of the undersea formations subjects the down-well equipment to highly corrosive sea water containing dissolved oxygen. Conventional corrosion-inhibiting agents are often not effective at all under such extreme conditions or reduce corrosion significantly for only a short period of time and then must be reapplied, often at great expense and inconvenience if the well site is not easily accessible or, as in the case of off-shore wells, poses difficulties of transporting and applying large volumes of chemicals.

It is therefore an object of this invention to provide a composition which can be applied to a metal surface to inhibit corrosion and pitting on the metal. It is a further object of the invention to provide a method of treating metal surfaces so as to form a film which inhibits corrosion of the metal under extreme conditions of temperature and pressure and in highly corrosive environments. It is a further object of the invention to provide an article having a surface film of a composition which inhibits corrosion.

SUMMARY OF THE INVENTION

According to the invention, there is provided a composition which, when applied to a metal surface, forms a corrosion-inhibiting film on the metal surface, the composition comprising an amine compond, a hydrocarbon diluent and carbon dioxide. The carbon dioxide can be added to and maintained in the composition in the form of a gas. The composition optionally contains an alcohol such as methanol. The composition can be applied by contacting the metal surface with the composition so as to form a film thereon. Also according to the invention, metal articles having a corrosion-inhibiting film thereon are provided.

DETAILED DESCRIPTION OF THE INVENTION

The amine compounds suitable for use in the invention compositions include fatty amines and polyamines. Polyamines suitable for use in the invention compositions contain at least one secondary or primary amine function. A class of amines particularly suitable for use in the compositions are N-alkyl- and N-alkenyl-substituted 1,3-diaminopropanes and mixtures of these. Examples of such polyamines include N-hexadecyl-1,3-diaminopropane, N-tetradecyl-1,3-diaminopropane, N-octadecyl-1,3-diaminopropane, N-pentadecyl-1,3-diaminopropane, N-heptadecyl-1,3-diaminopropane, N-nonadecyl-1,3-diaminopropane, and N-octadecenyl-1,3-diaminopropane. Various commercially available mixtures of N-alkylated and N-alkenylated diamines can be used in the invention. One such material is a commercial product sold under the tradename Duomeen® T. This product is N-tallow-1,3-diaminopropane in which the majority of the tallow substituent groups are alkyl and alkenyl containing from 16 to 18 carbon atoms each, with a majority of substituent groups having 14 carbon atoms each. It is presently believed that the effectiveness of such amines as Duomeen® T in the corrosion-inhibiting composition stems from their relatively high molecular weight, which produces a long-chain "net" to cover the metal surface, their polyfunctionality, and their relatively high boiling point, which permits their use in high-temperature environments. Other commercially-available materials include N-coco-1,3-diaminopropane in which the majority of the coco substituent groups contain 12 to 14 carbon atoms, commercially available under the tradename Duomeen® C, an N-soya-1,3-diaminopropane which contains $C_{18}$ alkenyl groups along with a minor proportion of $C_{16}$ alkyl groups.

Additional polyamines suitable for use in the invention composition are illustrated by the following examples: N-dodecyl diethylene triamine, N-tetradecyl diethylene triamine, N-tetradecyl dipropylene triamine, N-tetradecyl triethylene tetramine and the corresponding N-alkenyl triamines. Other examples of suitable aliphatic polyamines include tetraethylene pentamine, hexapropylene heptamine, pentaamylene hexamine, 5-methyl-1,9-nonanediamine, 1,12-dodecanediamine, 1,16-hexadecanediamine and the like.

Monoamines suitable for use in the invention compositions include compounds containing eight to twenty-five carbon atoms such as 2-methyl-4-aminoheptane, di-n-butylamine, n-butyl-n-hexylamine, octyl amine, decyl amine, dodecyl amine, tetradecyl amine, 2-aminohexane, 4-aminodecane, hexadecyl amine, 7-aminopentadecane, octadecyl amine, isooctyl amine, 1-aminoeicosane, 1-aminopentacosane, 4-aminotetracosane, 1-aminotricosane and the like including linear and/or variously branched aliphatic amines.

The amine is dissolved in a hydrocarbon diluent, preferably a hydrocarbon alcohol mixture, prior to $CO_2$ treatment. Examples of hydrocarbon diluents suitable for use in the invention composition include the isomeric xylenes, toluene, benzene, naphtha, cyclohexylbenzene, fuel oil, diesel oil, heavy aromatic oil, Stoddart solvent, crude oil and gas well condensate. The isomeric xylenes are presently preferred as the hydrocarbon component because of their ability to act as a solvent for the amine component. The high-boiling hydrocarbons are presently preferred for use in deeper wells having higher downhole temperatures and in high temperature gas and oil wells generally.

In some treatment methods, discussed below, it is advantageous to employ a carrier fluid or drive fluid to force a slug of the corrosion-inhibiting composition down into the well being treated. Any of the hydrocarbons listed above as suitable diluents can be used. For practical and economic reasons, diesel oil, sea water or condensate from the well being treated are preferred carrier fluids. An inert gas such as nitrogen can be used as the drive fluid.

The invention composition preferably contains an alcohol. Alcohols suitable for use in the composition include alkanols containing 1 to about 15 carbon atoms such as methanol, ethanol, 1-propanol, 2-propanol, butanols, pentanols, hexanols, heptanols, octanols, 1-pentadecanol and mixtures of these. Polyols containing 2 to 5 carbon atoms such as ethylene glycol, 1,3-propanediol, 2,3-butanediol, glycerol and pentaerythritol can also be used. Methanol is presently preferred as the alcohol component, particularly in a corrosion-inhibiting composition containing xylene as the aromatic hydrocarbon component and cocoamine as the amine.

Various alcohol-aromatic hydrocarbon azeotropes can be used in the invention compositions to supply at least partially the diluent and the alcohol components. Representative azeotropes include the following, with the weight percent of each component in parentheses: methanol (39.1)/ benzene (60.9); ethanol (32)/benzene(68); 2-propanol (33.3)/benzene(66.7); 1-propanol (16.9)/benzene(83.1); isobutyl alcohol(9.3)/benzene(90.7); 1-butanol(68)/p-xylene(32); 2-pentanol(28)/toluene(72) and hexanol(13)/p-xylene(87). It is also contemplated that impure alcohol streams such as mixed butanols resulting from oxo technology using propylene feedstock can be used in the treating compositions.

The invention corrosion-inhibiting composition contains carbon dioxide in an amount effective to improve the corrosion-inhibiting properties of the amine. The carbon dioxide is preferably added to the amine by bubbling the gas under pressure into a hydrocarbon solution of the amine. Carbon dioxide treating pressures can vary over the broad range of zero psig to 6000 psig, preferably 0.5 to 100 psig $CO_2$. In laboratory procedures, $CO_2$ treatment was carried out at ambient temperatures for convenience but treatments at lower temperatures such as 0° to 5° C. and higher temperatures such as 70° to 80° C. are acceptable. In ambient temperature treatments carried out in appropriate pressure equipment, the molar ratio of carbon dioxide to amine varies over the broad range of 100:1 to 1:100, preferably 10:1 to 1:10, most preferably 2:1 to 1:2. The carbon dioxide treatments can be carried out in essentially anhydrous hydrocarbon solutions of the amine. Alternatively, the $CO_2$ treatment of the amine can be carried out in an alcohol solvent such as methanol.

The presently preferred corrosion-inhibiting composition of the invention contains an alcohol component such as methanol, a hydrocarbon component such as xylene, and an amine component such as Duomeen ® C (an N-alkyl-1,3-propanediamine) in approximately a 1:1:1 (mL:mL:g) ratio. The alcohol is an optional, although preferred, component of the composition. If present, the weight percent of alcohol in the final $CO_2$-treated composition varies over the broad range of 1 to 99, preferably about 10 to 80 and most preferably about 20 to 40. The hydrocarbon component can be present in any concentration effective to maintain the composition in an essentially homogeneous and fluid, pumpable state.

The invention composition is useful in protecting oxidizable metal surfaces, particularly surfaces of objects formed from iron and steel. It is particularly useful for treating metal surfaces such as metal pipes and casings in oil, gas and geothermal wells which are subjected to high temperatures and pressures and to corrosive chemical agents, or for pipelines in which are transported fluids which contain water.

Downhole treatments with the $CO_2$-treated corrosion-inhibiting compositions can be carried out by a variety of methods depending upon the particular chemical and physical characteristics of the well being treated. In practice, the $CO_2$-treated corrosion inhibiting system can be maintained in storage tanks or drums for any desired period of time prior to pumping the mixture downhole. The following downhole treatment methods can be used to apply the composition to metal surfaces of equipment used to recover natural fluids from a subterranean reservoir.

Batch Treatment. The $CO_2$-treated composition containing, for example, alcohol, amine, and hydrocarbon diluent is introduced preferably in an oil carrier into the annulus of a cased wellbore between the casing and the tubing. The well is returned to production and the injected compositions are gradually returned with the produced fluids, effecting en route the coating of contacted metal surfaces with a corrosion-resistant film. Alternatively in this method, a liquid column of the treating agent can be placed in the tubing or the annular space and allowed to stand for a time which can range from 10 minutes to 24 hours, usually at least 2 hours, before resuming production.

Extended Batch Treatment. The $CO_2$-treated composition is injected into the annular space of a cased wellbore, the well is closed off, and the composition is continuously circulated with well fluids down the annulus and up the tubing for an extended period of time which can vary widely but will usually be between 6 and 48 hours. At the end of the determined time period, the well is returned to production.

Squeeze Treatment. The $CO_2$-treated composition is injected down a cased wellbore penetrating a subterranean formation and is forced into the formation against formation pressure with high-pressure pumps. The composition can be injected within a gelled or dispersed polymer matrix based, for example, on polyacrylamides, biopolysaccharides, or cellulose ethers. After the pressure is released, the treating agent is slowly produced back with the recovered fluids, resulting in the application of a corrosion-resistant film on metal surfaces contacted by the treating agent as it flows to the surface. This method is particularly suitable in high-pressure gas or oil wells.

Spearhead Treatment. A highly concentrated slug of the $CO_2$-treated composition is injected into the tubing of a cased borehole and pressured down the tubing with a fluid column of a brine solution such as 2 weight percent aqueous potassium chloride. When the pressure is released, the aqueous brine column and the corrosion-inhibiting composition are produced up the tubing. The composition as a concentrated slug thus contacts the metal walls of the tubing and lays down a protective film as it flows in a downward and upward circuit.

Metal surfaces can also be protected by dipping or spraying the surfaces with the invention compositions and then allowing excess fluid to drain from the treated surfaces at ambient conditions. A protective film is thus formed on the metal surface without conventional heatcuring or extended air-drying treatment, although such drying treatments can be used if desired and if conditions permit it. The advantage in using an anti-corrosion system which does not require air- or heat-drying is that the system can be applied to metal surfaces which are hundreds or thousands of feet below ground level or in an environment which is always flooded with brine or other fluids.

When applying the composition to the metal tubing of, for example, a gas or oil well or a pipeline, it is not necessary to pre-coat the treated metal surfaces with oil or other substances prior to applying the invention composition, and the treated surfaces may or may not have an oil coating prior to the application. It is contemplated that the invention composition will provide effective corrosion inhibition in wells producing as much as 95 percent brine and 5 percent oil.

EXAMPLE 1

Laboratory corrosion inhibition tests were carried out in 1-liter Erlenmeyer flasks equipped with magnetic stirring bars, under laboratory conditions designed to simulate corrosive oil-water environments encountered in field drilling sites. A charge of 50 mL of crude oil and 950 mL of synthetic brine was used in each run. A slow stream of carbon dioxide was bubbled through the solution during each test to maintain the mixture near saturation with $CO_2$ at ambient conditions. After 950 mL of synthetic North Sea water (93.1 g $CaCl_2 \cdot 2H_2O$, 46.4 g $MgCl_2 \cdot 6H_2O$, and 781.1 g NaCl per 5 gal distilled water) was charged into the Erlenmeyer flask, the preferred $CO_2$-treated corrosion inhibitor system containing amine, alcohol and hydrocarbon diluent was charged to the flask, and then the Teesside crude oil was added. A carbon steel probe was suspended in the stirred oil-water mixture maintained at about 49° C. during each run. The rate of corrosion and the pitting index were determined using a Corrator ® monitoring system available from Rohrback Instruments.

A 30 g portion of an amine solution containing approximately equal weights of Armeen ® C (cocoamine), methanol and xylene was charged to a 150 mL pressure bottle equipped with a magnetic stirrer and pressure gauge. During a period of about 30 minutes at ambient conditions, carbon dioxide was introduced into this stirred solution at 10 psig pressure. The weight of the system increased by 1.55 g due to the absorption of carbon dioxide. The inventive composition under $CO_2$ pressure was stored in an appropriate vessel prior to the corrosion tests summarized in Table 1.

TABLE 1

| Corrosion Inhibition by $CO_2$-Treated Cocoamine System | | | | |
| --- | --- | --- | --- | --- |
| Run | Test Period (hrs) | $CO_2$ Treatment | Corrosion Rate (mpy) | Pitting Index |
| 1 (invention)[a] | 0 | Yes | 1.4 | 3.1 |
| | 1 | | 0.9 | 0.1 |
| | 16 | | 0.45 | 0.13 |
| | 17.5 | | 0.55 | 0.02 |
| | 19 | | 0.58 | 0.17 |
| 2 (control)[b] | 0 | No | 0.9 | 2.5 |
| | 1 | | NR[c] | NR[c] |
| | 15 | | 1.6 | 0.8 |
| | 17 | | 1.5 | 0.8 |

TABLE 1-continued

| Corrosion Inhibition by $CO_2$-Treated Cocoamine System | | | | |
| --- | --- | --- | --- | --- |
| Run | Test Period (hrs) | $CO_2$ Treatment | Corrosion Rate (mpy) | Pitting Index |
| | 22 | | 1.3 | 0.6 |

[a] A 0.2 mL portion of Armeen ® C/methanol/xylene solution which had been treated with $CO_2$ was used with 50 mL Teesside oil and 950 mL synthetic Ekofisk sea water in run 1.
[b] A 0.2 mL portion of an untreated Armeen ® C/methanol/xylene solution was used in run 2 (control).
[c] NR indicates no reading was taken The results of the runs reported in Table 1 show that the $CO_2$-treated fatty amine system reduced the corrosion rate over a given time as compared to a fatty amine system not treated with $CO_2$.

EXAMPLE 2

This example demonstrates the use of a primary aliphatic diamine such as 5-methyl-1,9-nonanediamine (5-MND) in the invention corrosion-inhibition method. A 30 g portion of an amine solution containing 20 g xylene and 10 g 5-MND was charged to a 150 m pressure bottle equipped with a magnetic stirrer and pressure gauge. The introduction of carbon dioxide into this solution at ambient conditions resulted in the formation of a precipitate. A 5 g sample of methanol was added to the system to dissolve the precipitate and the system was repressured to 10 psig with carbon dioxide. The system remained as a homogeneous mixture for about 45 minutes before separation into a top phase and a bottom phase. These individual phases were treated separately and the results are shown in Table 2. The weight gain from absorption of carbon dioxide was 3.1 g. The control system was prepared by mixing 20 g xylene, 10 g 5-MND and 5 g methanol.

TABLE 2

| Corrosion Inhibition by $CO_2$-Treated 5-MND System | | | | |
| --- | --- | --- | --- | --- |
| Run | Test Period (hrs) | $CO_2$ Treatment | Corrosion Rate (mpy) | Pitting Index |
| 3 (invention top phase)[a] | 0 | Yes | 0.01 | 0.03 |
| | 1¾ | | 0.01 | 0.13 |
| | 3⅛ | | 0.01 | 0.04 |
| | 19 | | 0.01 | 0.02 |
| 4 (invention bottom phase)[a] | 0 | Yes | 2.8 | 0.1 |
| | 1¾ | | 2.4 | 0.4 |
| | 3⅜ | | 2.2 | 0.1 |
| | 19 | | 0.02 | 0.02 |
| 5 (control) | 2 | No | 26 | 2 |
| | 4 | | 27 | 1 |
| | 6 | | 26 | 3 |
| | 21 | | 25 | 4 |

[a] A 0.25 mL portion of the top phase and bottom phase, respectively, was used in invention runs 3 and 4. In the Corrator ® tests, 50 mL Teesside oil and 950 mL synthetic Ekofisk sea water were used with the inhibitor systems.

The results of the runs shown in Table 2 demonstrate that the $CO_2$-treated 5-MND system of runs 3 and 4 was significantly more effective in inhibiting corrosion than was the untreated 5-MND system of run 5. It appears that the active corrosion inhibiting species may have been more concentrated in the upper phase of the $CO_2$-treated system (run 3) because of the rapid reduction of the corrosion rate resulting from the use of this phase. However, the bottom phase was also an effective corrosion inhibiting system, as shown particularly in the corrosion rate and pitting index values obtained after 19 hours.

EXAMPLE 3

This example demonstrates that the effectiveness of tertiary amines as corrosion inhibitors does not appear to be enhanced by $CO_2$ treatment. The tertiary amines considered were oleyl imidazoline (from A. Gross & Co.) and N,N-dimethyl cocoamine (Armeen® DMCD). The $CO_2$ treatments and corrosion tests were carried out essentially in the same manner as in Examples 1 and 2. Results are listed in Table 3.

TABLE 3

Corrosion Inhibition by $CO_2$-Treated Tertiary Amines

| Run | Test Period (hrs) | $CO_2$ Treatment | Corrosion Rate (mpy) | Pitting Index |
|---|---|---|---|---|
| 6 ($CO_2$-treated)[a] | 0 | Yes | 7[c] | 3 |
|  | 1 |  | 8 | 3 |
|  | 17 |  | 0.02 | 0.35 |
|  | 18.5 |  | 0.02 | 0.36 |
|  | 20.5 |  | 0.06 | 0.46 |
| 7 (untreated)[a] | 0 | No | 0.4[c] | 0.3 |
|  | 16 |  | 0.03 | 0.03 |
|  | 18 |  | 0.01 | 0.06 |
|  | 20.5 |  | 0.04 | 0.02 |
| 8 ($CO_2$-treated)[b] | 0 | Yes | 16[d] | 3 |
|  | 1 |  | 4.3 | 1.7 |
|  | 2 |  | 2.4 | 0.7 |
|  | 18 |  | 0.17 | 0.3 |
| 9 (untreated)[b] | 0 | No | 13[d] | 4 |
|  | 1 |  | 1.8 | 0.6 |
|  | 2 |  | 1.9 | 0.2 |

[a] A mixture of 10 g Armeen® DMCD, 10 g methanol and 10 g xylene was pressured to 10 psig $CO_2$ for 30 minutes. Approximately 0.6 g $CO_2$ was absorbed.
[b] A mixture of 10 g oleyl imidazoline, 10 g methanol and 10 g xylene was pressured to 10 psig $CO_2$ for 30 minutes. Approximately 1.10 g $CO_2$ was absorbed.
[c] A 0.25 mL sample of the untreated inhibitor system was used in the corrosion test.
[d] A 0.20 mL sample of the untreated inhibitor system was used in the corrosion test.

The results tabulated in Table 3 suggest that $CO_2$ treatment of the tertiary amine systems used in runs 6 and 8 did not significantly improve the corrosion-inhibiting properties of those systems.

EXAMPLE 4

This example illustrates the $CO_2$ treatment of a primary aliphatic diamine such as 5-methyl-1,9-nonanediamine (5-MND) in methanol solvent for use of the resulting composition as a corrosion inhibitor.

A 24 g portion of an amine solution containing 16 g methanol and 8 g 5-MND was charged to a 150 mL pressure bottle equipped with a magnetic stirrer and pressure gauge. The system was pressured to 10 psig with carbon dioxide and a weight increase of 2.93 g was observed from the absorption of carbon dioxide. An aliquot of this solution was used in invention run 10 (see Table 4). Sufficient xylene was added to another aliquot of this solution to give a system containing 99 parts by weight methanol to 1 part xylene for use in invention run 11. A control run (run 12) system was prepared by mixing 16 g methanol and 8 g 5-MND. The results of runs using these systems for inhibiting corrosion in a Teesside oil and synthetic Ekofisk seawater environment are shown in the table below. Laboratory Corrator® tests were carried out in the same manner as described in Example 2.

TABLE 4

Corrosion Inhibition by $CO_2$-Treated 5-MND in Methanol

| Run | Test Period (hrs) | $CO_2$ Treatment | Solvent System | Corrosion Rate (mpy) | Pitting Index |
|---|---|---|---|---|---|
| 10 | 1 | Yes | $CH_3OH$ | 0.01 | 0.04 |
|  | 1.5 |  |  | 0.01 | 0.04 |
|  | 18 |  |  | 0.01 | 0.04 |
|  | 19 |  |  | 0.01 | 0.04 |
| 11 | 1 | Yes | 99 parts $CH_3OH$ 1 part Xylene | 0.01 | 0.06 |
|  | 1.5 |  |  | 0.21 | 0.09 |
|  | 18 |  |  | 0.16 | 0.62 |
|  | 19 |  |  | 0.10 | 0.47 |
| 12 | 1 | No | $CH_3OH$ | 1.9 | 2.1 |
|  | 1.5 |  |  | 7 | 0.4 |
|  | 18 |  |  | 0.29 | 0.28 |
|  | 19 |  |  | 0.1 | 0.22 |

The results reported in Table 4 demonstrate the superiority of the $CO_2$-treated 5-MND systems either in $CH_3OH$ alone or in a mixture containing 99 parts $CH_3OH$ per 1 part xylene, as compared with a system which received no $CO_2$ treatment.

I claim:

1. A composition which forms a corrosion-inhibiting film when applied to a metal surface, the composition comprising:

a primary or secondary amine selected from the groups consisting of monoamines containing eight to twenty-five carbon atoms, fatty amines and polyamines;

a diluent selected from the group consisting of essentially anhydrous liquid hydrocarbons and mixtures of essentially anhydrous hydrocarbons and alcohols; and carbon dioxide present in the composition in an amount effective to improve the corrosion-inhibiting properties of the composition.

2. The composition of claim 1 in which the monoamine containing eight to twenty-five carbon atoms is a fatty amine.

3. The composition of claim 1 in which the polyamine containing eight to twenty-five carbon atoms is a fatty amine.

4. The composition of claim 1 in which the amine is a polyamine containing at least one primary or secondary amino function.

5. The compostion of claim 4 in which the amine is selected from N-alkyl- and N-alkenyl-substituted 1,3-diaminopropanes and mixtures of these.

6. The composition of claim 5 in which the amine comprises N-coco-1,3-diaminopropane.

7. The composition of claim 5 in which the diluent comprises xylene.

8. The composition of claim 5 in which the diluent comprises an alkanol having from 1 to about 15 carbon atoms present in an amount in the range of about 10 to about 80 weight percent, based on the weight of the composition.

9. The composition of claim 8 in which the diluent comprises methanol.

10. The composition of claim 9 in which the diluent further comprises xylene.

11. The composition of claim 1 in which the carbon dioxide is in the form of a gas under pressure.

12. The composition of claim 11 in which the molar ratio of carbon dioxide to amine is within the range of about 100:1 to about 1:100.

13. The composition of claim 12 in which the molar ratio of carbon dioxide to amine is within the range of about 10:1 to about 1:10.

14. The composition of claim 13 in which the diluent comprises a mixture of xylene and methanol and the amine comprises N-coco-1,3-diaminopropane.

15. The composition of claim 13 in which the amine is 5-methyl-1,9-nonanediamine.

16. The composition of claim 13 in which the amount of alcohol in the composition is within the range of about 10 to about 80 weight percent based on the weight of the composition.

17. The composition of claim 16 in which the alcohol is present in an amount of about 20 to about 40 weight percent.

18. The composition of claim 1 in which the amine is a monoamine containing about eight to about twenty-five carbon atoms.

19. The composition of claim 18 in which the diluent comprises xylene.

20. The composition of claim 19 in which the diluent further comprises methanol.

21. A method for preparing a corrosion-inhibiting composition comprising:
providing a solution comprising a primary or secondary amine and a diluent selected from essentially anhydrous hydrocarbons and mixtures of essentially anhydrous hydrocarbons and alcohols;
introducing into the solution carbon dioxide gas at greater than atmospheric pressure; and
maintaining the thus-produced carbon dioxide-containing composition at greater than atmospheric pressure for a finite time prior to application in a corrosive environment.

22. A composition which forms a corrosion-inhibiting film when applied to a metal surface, which composition is the product of introducing carbon dioxide under greater than atmospheric pressure into a diluent selected from the group consisting of essentially anhydrous liquid hydrocarbons and mixtures of essentially anhydrous hydrocarbons and alcohols, the diluent containing a primary or secondary amine, and maintaining the resulting carbon dioxide-containing composition at greater than atmospheric pressure for a finite period of time prior to application of the corrosion-inhibiting composition to the metal surface.

23. The composition of claim 22 in which the molar ratio of carbon dioxide to amine is within the range of about 100:1 to about 1:100.

24. The composition of claim 23 in which the molar ratio of carbon dioxide to amine is within the range of about 10:1 to about 1:10.

25. The composition of claim 24 in which the diluent comprises an alcohol present in an amount in the range of about 10 to about 80 weight percent based on the weight of the composition.

26. The composition of claim 25 in which the diluent comprises an alcohol present in an amount in the range of about 20 to about 40 weight percent.

27. The composition of claim 26 in which the primary or secondary amine is selected from the group consisting of N-alkyl- and N-alkenyl-substituted 1,3-diaminopropanes.

* * * * *

UNITED STATES PATENT AND TRADEMARK OFFICE
CERTIFICATE OF CORRECTION

PATENT NO.  : 4,460,482
DATED       : July 17, 1984
INVENTOR(S) : Yulin Wu

It is certified that error appears in the above-identified patent and that said Letters Patent is hereby corrected as shown below:

Claim 1, line 6 cancel ",fatty amines".

Signed and Sealed this

Fifth Day of March 1985

[SEAL]

Attest:

DONALD J. QUIGG

Attesting Officer     Acting Commissioner of Patents and Trademarks